(No Model.)
S. WALTER.
BUCK SAW.
No. 315,577. Patented Apr. 14, 1885.
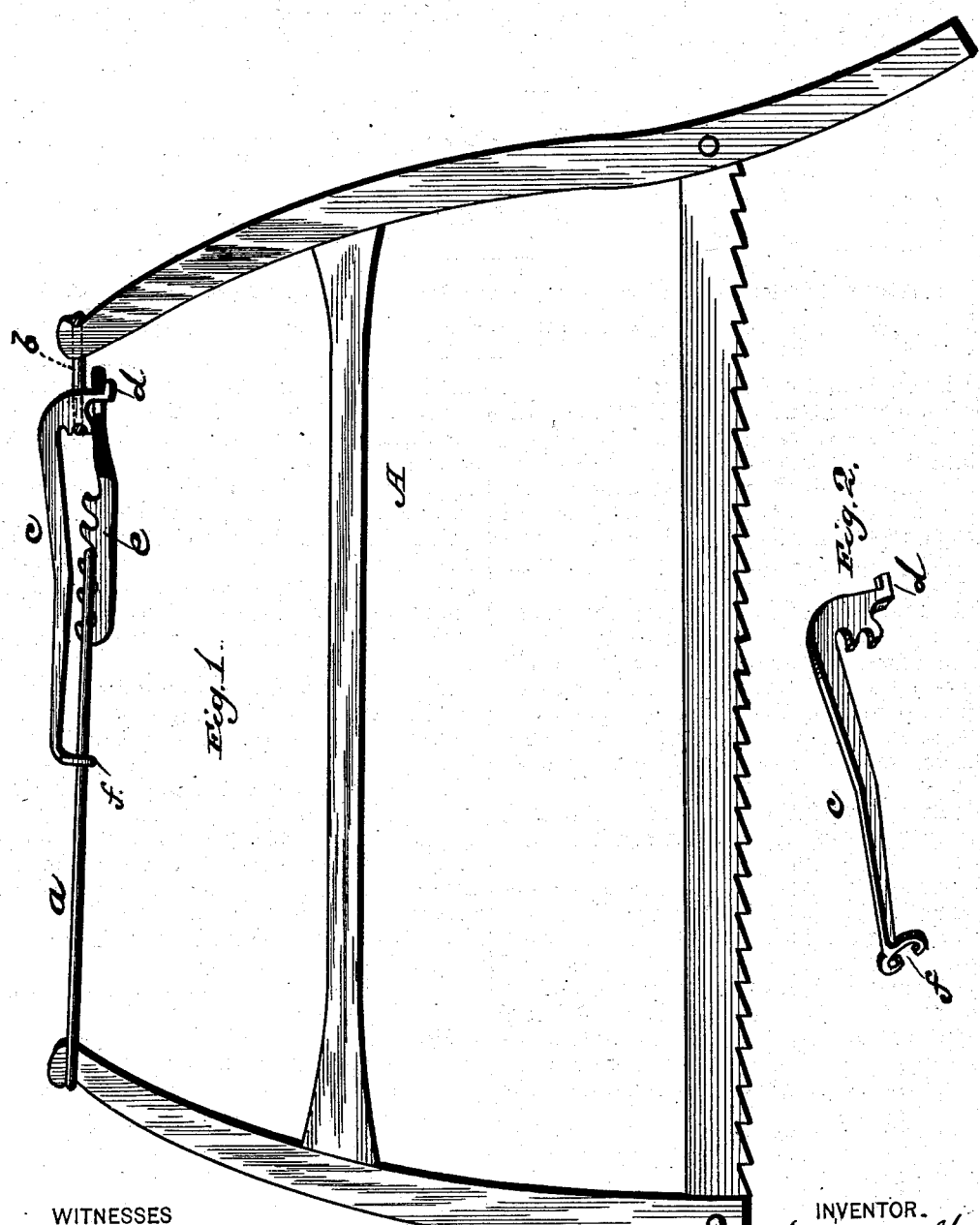
WITNESSES
INVENTOR.
Samuel Walter.
by Chas. D. Gilmore
his ATTORNEY.

UNITED STATES PATENT OFFICE.

SAMUEL WALTER, OF DALLAS CITY, ILLINOIS.

BUCK-SAW.

SPECIFICATION forming part of Letters Patent No. 315,577, dated April 14, 1885.

Application filed October 17, 1884. (No model.)

*To all whom it may concern:*

Be it known that I, SAMUEL WALTER, a citizen of the United States of America, residing at Dallas City, in the county of Hancock and State of Illinois, have invented certain new and useful Improvements in Buck-Saws, of which the following is a specification, reference being had therein to the accompanying drawings.

This invention has relation to improvements in buck-saws; and it consists in the novel construction and arrangement of devices, as will be hereinafter more fully explained, and particularly pointed out in the claim appended.

The annexed drawings, to which reference is made, fully illustrate my invention, in which—

Figure 1 represents a side view of a saw, showing my improvement; and Fig. 2 is a perspective view of the lever $c$.

Referring by letter to the accompanying drawings, A designates a buck-saw, the frame portion of which is constructed in the usual manner. The upper ends of the front and rear bars of the frame are each provided with a long link, $a$, and a short link, $b$. The latter is connected to a notch in one end of the fulcrum-lever $c$, which connection forms the fulcrum of the lever whereby the saw-frame is tightened. To the hook end $d$ of this lever is connected one end of a rack-bar, $e$, the teeth of which engage one end of the long link, as shown. This fulcrum-lever is provided at the opposite end to that of the fulcrum end with an open eye or hook, $f$, which engages long link and secures the lever after the device has been adjusted, and by this construction it will be seen that a powerful tension can be given to the brace-rod with but little exertion.

What I claim, and desire to secure by Letters Patent, is—

In a buck-saw frame, the combination, with the two arms of the frame, of the long link $a$, secured at one end to the forward arm and at the other to the rack-bar $e$, said rack-bar engaging at one end with the lever $c$, the said lever being secured to the short link $b$, which engages with the rear arm of said frame, and the hook $f$ on the end of said lever, by which the same is secured to the link $a$ and the tension of the frame secured.

In testimony whereof I affix my signature in presence of two witnesses.

SAMUEL WALTER.

Witnesses:
G. B. WILLIAMS,
J. S. SWOYER.